United States Patent
Ohyagi et al.

(10) Patent No.: US 7,278,913 B2
(45) Date of Patent: Oct. 9, 2007

(54) RACING GAME PROGRAM AND VIDEO GAME DEVICE

(75) Inventors: Yasuyuki Ohyagi, Kyoto (JP); Katsuhisa Satou, Kyoto (JP)

(73) Assignee: Nintendo Co., Ltd., Kyoto-Shi (JP)

( * ) Notice: Subject to any disclaimer, the term of this patent is extended or adjusted under 35 U.S.C. 154(b) by 183 days.

(21) Appl. No.: 10/968,254

(22) Filed: Oct. 20, 2004

(65) Prior Publication Data
US 2005/0096110 A1     May 5, 2005

(30) Foreign Application Priority Data
Nov. 4, 2003 (JP) .............................. 2003-374795

(51) Int. Cl.
*A63F 13/00* (2006.01)
(52) U.S. Cl. ........................................................ 463/6
(58) Field of Classification Search ................ 463/6, 463/7, 43, 59–60
See application file for complete search history.

(56) References Cited

U.S. PATENT DOCUMENTS 4,148,485 A     4/1979  Rains

2003/0109296 A1  6/2003  Leach et al.

FOREIGN PATENT DOCUMENTS

| JP | 2747405 | 2/1998 |
| JP | 27474205 | 2/1998 |
| JP | 2003-103048 | * 4/2003 |

OTHER PUBLICATIONS

Adzima, "Using AI to Bring Open City Racing to Life", Game Developer, Dec. 2000, vol. 7, No. 12, pp. 26-32.

* cited by examiner

*Primary Examiner*—Kim Nguyen
(74) *Attorney, Agent, or Firm*—Nixon & Vanderhye P.C.

(57) ABSTRACT

A racing game in which a player moving object controlled by a human player and a plurality of non-player moving objects automatically controlled based on a predetermined algorithm race together on a course in a virtual space is provided, wherein: different target places are set for the plurality of non-player moving objects; a driving performance value preset for each non-player moving object is changed according to the target place thereof; and each non-player moving object is automatically controlled according to the changed driving performance value thereof. Thus, it is possible to provide a thrilling racing game.

21 Claims, 14 Drawing Sheets

FIG. 6

| KART | BASIC DRIVING PERFORMANCE VALUE | |
| --- | --- | --- |
| | BASIC MAXIMUM SPEED | BASIC ACCELERATION |
| KART A | 130 | 2.5 |
| KART B | 125 | 5.0 |
| KART C | 120 | 7.5 |
| KART D | 95 | 10.0 |
| KART E | 90 | 12.5 |
| KART F | 85 | 15.0 |
| KART G | 80 | 17.5 |

FIG. 7

| KART CLASSIFICATION | KART | TARGET PLACE |
| --- | --- | --- |
| PLAYER KART | KART B | — |
| RIVAL KART | KART A | 1ST |
| | KART D | 2ND |
| NORMAL KART | KART C | 3RD |
| | KART E | 4TH |
| | KART F | 5TH |
| | KART G | 6TH |

| TARGET PLACE | OFFSET | |
|---|---|---|
| | MAXIMUM SPEED | ACCELERATION |
| 1ST | +30% | +20% |
| 2ND | +20% | +15% |
| 3RD | +15% | +10% |
| 4TH | +10% | +5% |
| 5TH | +5% | ±0% |
| 6TH | ±0% | −5% |

| KART CLASSIFICATION | KART | TARGET PLACE |
|---|---|---|
| PLAYER KART | KART B | — |
| RIVAL KART | KART A | 2ND |
| RIVAL KART | KART D | 1ST |
| NORMAL KART | KART C | 3RD |
| NORMAL KART | KART E | 4TH |
| NORMAL KART | KART F | 5TH |
| NORMAL KART | KART G | 6TH |

FIG. 17

| KART CLASSIFICATION | KART | TARGET PLACE |
|---|---|---|
| PLAYER KART | KART B | — |
| RIVAL KART | KART A | 1ST |
| | KART D | 2ND |
| NORMAL KART | KART C | 6TH |
| | KART E | 3RD |
| | KART F | 4TH |
| | KART G | 5TH |

FIG. 18

STANDINGS
THIRD RACE (OF FIVE RACES) FINISHED

| | FIRST RACE RESULTS | SECOND RACE RESULTS | THIRD RACE RESULTS | TOTAL SCORE |
|---|---|---|---|---|
| KART A | 20 | 15 | 20 | 55 |
| KART B | 10 | 20 | 15 | 45 |
| KART D | 15 | 8 | 10 | 33 |
| KART C | 5 | 10 | 8 | 23 |
| KART E | 8 | 5 | 3 | 16 |
| KART F | 1 | 3 | 5 | 9 |
| KART G | 3 | 1 | 1 | 5 |

FIG. 20

| | FIRST RACE RESULTS | SECOND RACE RESULTS | THIRD RACE RESULTS | TOTAL SCORE |
|---|---|---|---|---|
| | STANDINGS THIRD RACE (OF FIVE RACES) FINISHED | | | |
| KART B | 20 | 20 | 20 | 60 |
| KART A | 10 | 15 | 15 | 40 |
| KART D | 15 | 8 | 8 | 31 |
| KART C | 5 | 10 | 10 | 25 |
| KART E | 8 | 5 | 3 | 16 |
| KART F | 1 | 3 | 5 | 9 |
| KART G | 3 | 1 | 1 | 5 |

FIG. 21

| KART CLASSIFICATION | KART | TARGET PLACE |
|---|---|---|
| PLAYER KART | KART B | — |
| RIVAL KART | KART A | 1ST |
| | KART D | 1ST |
| NORMAL KART | KART C | 3RD |
| | KART E | 4TH |
| | KART F | 5TH |
| | KART G | 6TH |

FIG. 22

| | FIRST RACE RESULTS | SECOND RACE RESULTS | THIRD RACE RESULTS | TOTAL SCORE |
|---|---|---|---|---|
| KART A | 20 | 15 | 20 | 55 |
| KART D | 10 | 20 | 10 | 40 |
| KART E | 15 | 8 | 15 | 38 |
| KART B | 5 | 10 | 5 | 20 |
| KART C | 8 | 5 | 3 | 16 |
| KART F | 1 | 3 | 8 | 12 |
| KART G | 3 | 1 | 1 | 5 |

STANDINGS
THIRD RACE (OF FIVE RACES) FINISHED

FIG. 23

| KART CLASSIFICATION | KART | TARGET PLACE |
|---|---|---|
| PLAYER KART | KART B | — |
| RIVAL KART | KART A | 2ND |
| | KART D | 1ST |
| NORMAL KART | KART C | 3RD |
| | KART E | 4TH |
| | KART F | 5TH |
| | KART G | 6TH |

RACING GAME PROGRAM AND VIDEO GAME DEVICE

FIELD OF THE INVENTION

The exemplary illustrative embodiments herein relate to a racing game program and a video game device, and more particularly to a racing game in which a player moving object controlled by a human player and a plurality of non-player moving objects automatically controlled based on a predetermined algorithm race together on a course in a virtual space.

BACKGROUND AND SUMMARY OF THE INVENTION

In conventional racing games in which a plurality of moving objects race against one another, various improvements have been made to make each race more thrilling. For example, in a video game system disclosed in Japanese Patent No. 2747405, when two racing cars are significantly distant from each other, the performance values of these racing cars such as the maximum speed are changed so that the distance therebetween will decrease. Then, it is less likely that a particular racing car will be excessively ahead of or excessively behind the other racing cars, thus making the race more thrilling.

However, in the corresponding video game system, the distance between racing cars, each controlled by a different human player, is adjusted so as to reduce the difference between the players' skills. Directly applying this conventional approach to a case where a moving object is automatically controlled by a computer based on a predetermined algorithm, thereby resulting in more accurate control than human player control, leads to disadvantages.

Since the driving performance of a racing car running behind is adjusted to be higher than that of another racing car running ahead, it is likely that most or all of the racing cars automatically controlled by the computer will stay bunched up together. Then, the places of the racing cars automatically controlled by the computer will be changing constantly, whereby a human player cannot feel like he or she is competing against a particular racing car for a better place, and the human player cannot experience distinct characteristics of each racing car.

When such conventional techniques are applied to a racing game in which a racing car controlled by a human player and a plurality of racing cars controlled by a computer race together through a series of races for total scores, the final places of the racing cars controlled by the computer will be at random for each race. Then, the racing cars controlled by the computer are likely to have total scores close to one another, in which case the human player may be able to easily win by far the highest total score, or a racing car controlled by the computer which happens to stably take not-so-low places may win 1st place in the end-of-series standings even if the racing car does not race particularly well in any individual races. In either case, the difficulty of the game may become excessively low.

In order for each racing car automatically controlled by a computer to have its distinct characteristics, a plurality of racing cars having different levels of driving performance may be used. However, this may result in those racing cars of higher performance levels always winning higher places. In other words, no matter how many races are played, the racing cars automatically controlled by the computer will always take generally the same places, thus producing monotonous race results, whereby the player is likely to get tired of the game relatively soon.

Therefore, a feature of an exemplary illustrative embodiment is to provide a racing game, in which one or more of a plurality specified moving objects controlled by a computer can behave as strong rivals for a moving object controlled by a human player.

Another feature of an exemplary illustrative embodiment is to provide a racing game where the final standings are determined based on the results of a plurality of races, in which one or more moving specified objects controlled by a computer can behave as strong rivals for a moving object controlled by a human player throughout a series of races.

The exemplary illustrative embodiments may have the following aspects to attain the features mentioned above. Note that reference numerals and figure numbers are shown in parentheses below for assisting the reader in finding corresponding components in the figures to facilitate the understanding of the exemplary illustrative embodiments, but they are in no way intended to restrict the scope of the invention.

A first aspect of an exemplary illustrative embodiment is directed to a computer-readable recording medium, storing a racing game program for playing a racing game in which a player moving object (Kart B) controlled by a human player and a plurality of non-player moving objects (Karts A, C to G) automatically controlled based on a predetermined algorithm race together on a course in a virtual space, wherein the racing game program instructs a computer (21) to function as target place setting means (21, 43), driving performance value changing means (21, 45) and automatic control means (21, 47). The target place setting means is means for setting different target places for at least two of the plurality of non-player moving objects (FIG. 7). The driving performance value changing means is means for changing a driving performance value (FIG. 6) preset for each of the non-player moving objects according to the target place thereof set by the target place setting means (FIG. 8). The automatic control means is means for automatically controlling each of the non-player moving objects according to the driving performance value thereof which has been changed by the driving performance value changing means.

According to a second aspect, in the first aspect, the driving performance value includes at least one of a maximum speed performance value and an acceleration performance value (FIG. 6).

According to a third aspect, in the first aspect, the racing game program instructs the computer to function further as current place obtaining means (21, 49) for obtaining a current place of each non-player moving object running on the course among the plurality of non-player moving objects; and the automatic control means controls a speed of each non-player moving object so that the current place thereof comes closer to the target place thereof (S209).

According to a fourth aspect, in the first aspect, the racing game program instructs the computer to function further as target place changing means (21, 51) for changing the target places set by the target place setting means.

According to a fifth aspect, in the fourth aspect, the target place changing means changes the target places of the non-player moving objects while the non-player moving objects are running on the course (S215, S217).

According to a sixth aspect, in the fifth aspect, the plurality of non-player moving objects include two rival moving objects (Karts A, D) and at least one normal moving object (Karts C, E to G); the target place setting means sets the target place of a first one of the two rival moving objects to 1st while setting the target place of a second one of the two rival moving objects to 2nd (FIG. 7); and if the first rival moving object whose target place is 1st falls significantly behind the second rival moving object whose target place is 2nd (for example, if a parameter indicating how much the first rival moving object is behind the second rival moving object, such as the difference in place therebetween, the difference in time therebetween, the distance therebetween, the difference in total score therebetween, etc., exceeds a predetermined threshold value), the target place changing means switches around the target places of the first and second rival moving objects (S403).

According to a seventh aspect, in the fourth aspect, the racing game is such that a plurality of moving objects, including the player moving object and the non-player moving objects, compete against one another for total scores determined based on results of a series of races (the first to fifth races); the racing game program instructs the computer to function further as total score calculation means (21, 53) for calculating a total score of each moving object after each race; and the target place changing means changes the target places based on the calculation by the total score calculation means after a race is finished and before a next race begins (S115).

According to an eighth aspect, in the seventh aspect, the plurality of non-player moving objects include two rival moving objects (Karts A, D) and at least one normal moving object (Karts C, E to G); the target place setting means sets the target place of a first one of the two rival moving objects to 1st while setting the target place of a second one of the two rival moving objects to 2nd (FIG. 7); and after a race, if the total score of either one of the two rival moving objects or an overall standing thereof determined based on the total score is significantly higher than that of the player moving object (FIG. 22), the target place changing means changes the target places of the two rival moving objects so that the target place of the rival moving object with a higher total score is 2nd while that of the rival moving object with a lower total score is 1st (FIG. 23).

According to a ninth aspect, in the seventh aspect, the plurality of non-player moving objects include two rival moving objects (Karts A, D) and at least one normal moving object (Karts C, E to G); the target place setting means sets the target place of one of the two rival moving objects to 1st while setting the target place of the other rival moving object to 2nd (FIG. 7); and after a race, if the total scores of the two rival moving objects are both significantly lower than that of the player moving object (FIG. 20), the target place changing means changes the target places of the two rival moving objects so that the target places of the first and second rival moving objects are both 1st (FIG. 21).

A tenth aspect of an exemplary illustrative embodiment is directed to a video game device, including the computer-readable recording medium of the first aspect, and a computer for executing the racing game program stored in the computer-readable recording medium.

In the first aspect, the target places are set for at least two non-player moving objects and the driving performance values of the non-player moving objects are changed, whereby the results of the racing game can be controlled intentionally to some extent. Therefore, it is possible to stage a situation where the player moving object is racing closely against a particular non-player moving object, for example.

In the second aspect, how well each non-player moving object will do in a race can be controlled intentionally to some extent simply by changing parameters such as the maximum speed performance value or the acceleration performance value of the moving object according to the target place thereof.

In the third aspect, the current place of each non-player moving object is obtained, and the non-player moving object is controlled so that the current place comes closer to the target place. Thus, it is possible to more effectively control the non-player moving object to be in, or come closer to, the target place thereof.

In the fourth aspect, the results of the racing game can be adjusted flexibly.

In the fifth aspect, the results of each race can be adjusted flexibly.

In the sixth aspect, the target places of two rival moving objects are controlled. Therefore, even if the rival moving object whose target place is 1st falls significantly behind by an accident, whereby the rival moving object whose target place is 2nd is moved up to 1st place, for example, it is possible to avoid a situation where the rival moving object whose target place is 2nd and which is now running in 1st place decelerates attempting to come in 2nd place.

In the seventh aspect, the total scores can be adjusted flexibly.

In the eighth aspect, if the total score of one rival moving object is significantly higher than that of the player moving object, the target place of the rival moving object with the higher total score is changed to 2nd. Thus, it is possible to avoid a situation where a particular rival moving object takes such a big lead as to discourage the player.

In the ninth aspect, if the total score of the player moving object is significantly higher than those of the rival moving objects, the target places of the two rival moving objects are both set to 1st. Then, the rival moving objects will race more closely against each other, thus increasing the difficulty of the game, and making the race more thrilling.

BRIEF DESCRIPTION OF THE DRAWINGS

These and other features and advantages will be better and more completely understood by reference to the following detailed description of exemplary illustrative embodiments in conjunction with the drawings of which:

FIG. 6 shows an example of basic driving performance value data 57;

FIG. 7 shows an example of target place data stored in a work memory 23;

FIG. 17 shows still another example of target place data stored in the work memory 23;

FIG. 18 shows an example of a game image for notifying a player of total scores;

FIG. 20 shows another example of a game image for notifying a player of total scores;

FIG. 21 shows still another example of target place data stored in the work memory 23;

FIG. 22 shows still another example of a game image for notifying a player of total scores; and FIG. 23 shows still another example of target place data stored in the work memory 23.

DETAILED DESCRIPTION

An exemplary illustrative embodiment will now be described with reference to the drawings.

Figure 1:
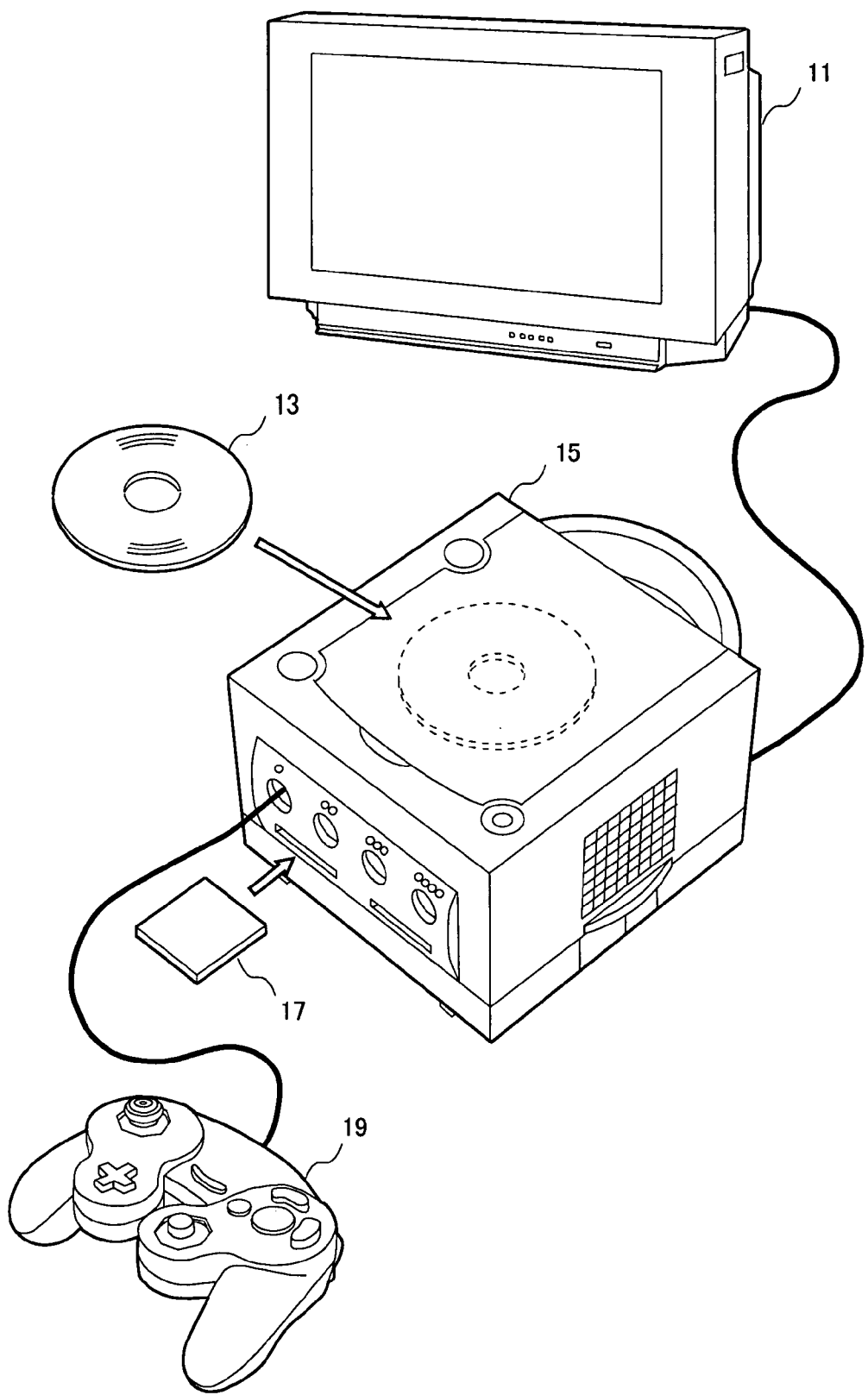
FIG. 1 is a view generally illustrating a video game system according to one exemplary illustrative embodiment.
Figure 2:
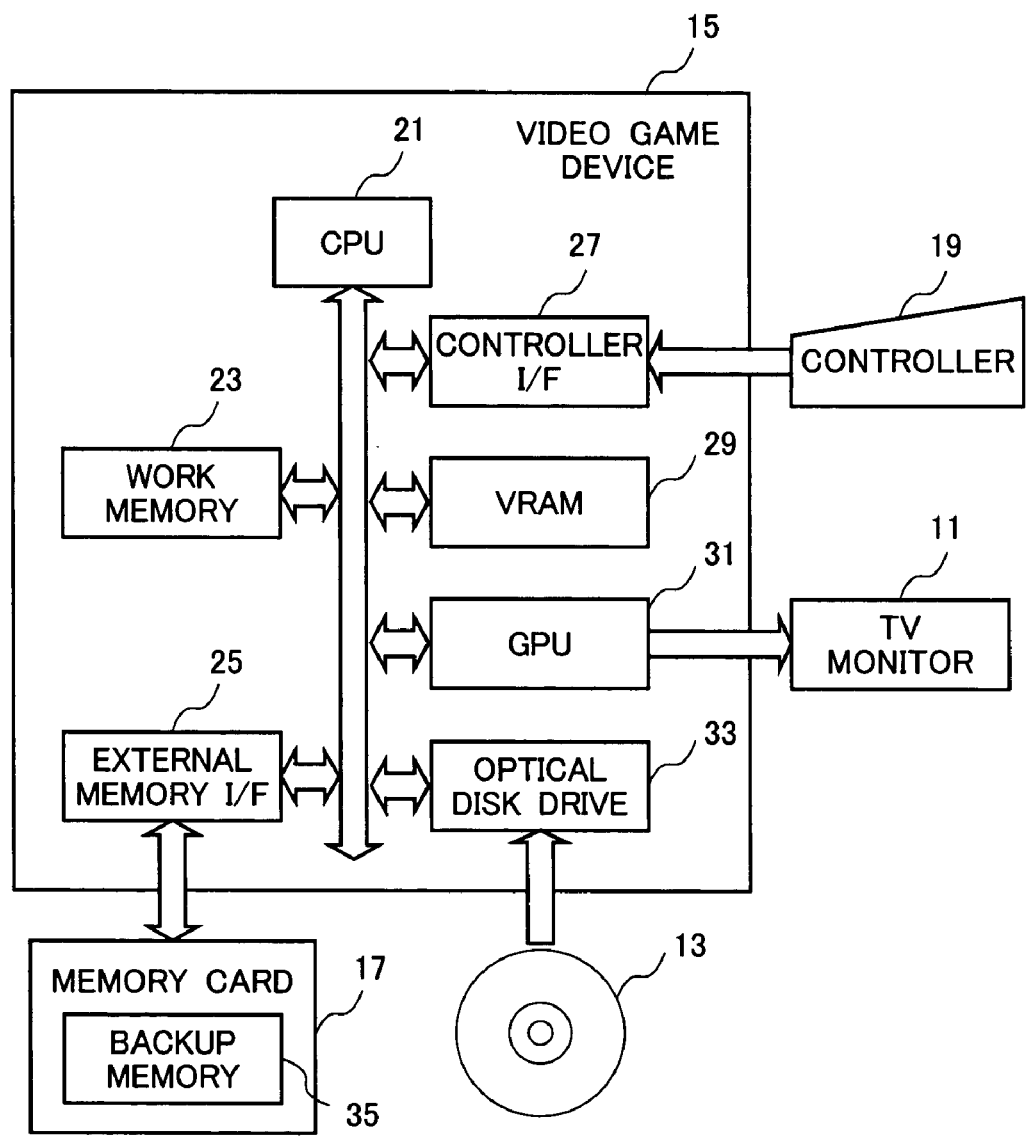
FIG. 2 is a block diagram illustrating a configuration of an exemplary illustrative video game system.

FIG. 1 is a view generally illustrating a configuration of a video game system according to one exemplary illustrative embodiment, and FIG. 2 is a block diagram thereof. Referring to FIG. 1 and FIG. 2, the video game system includes a TV monitor 11, a DVD-ROM 13, a video game device 15, a memory card 17 and a controller 19. The DVD-ROM 13 and the memory card 17 can be mounted/dismounted onto/from the video game device 15. The controller 19 is connected, via a connection cable, to the connector of one of a plurality (four in FIG. 1) of controller ports of the video game device 15. The TV monitor 11 is connected to the video game device 15 via an AV cable, or the like. Note that the connection between the video game device 15 and the controller 19 may be a wireless connection. Referring to FIG. 2, each section of the video game system will now be described in greater detail.

The DVD-ROM 13 statically stores the game program, game data, etc. When the player plays the game, the DVD-ROM 13 is mounted onto the video game device 15. Instead of the DVD-ROM 13, the means for storing the game program, etc., may be any other suitable computer-readable recording medium such as, for example, a CD-ROM, an MO disk, a memory card or a ROM cartridge.

The memory card 17 includes, as a backup memory 35, a rewritable storage medium such as a flash memory. Data, e.g., saved game data, is stored on the backup memory 35.

The video game device 15 reads out the program recorded on the DVD-ROM 13, and performs various processes according to the program.

The controller 19 is an input device with which the player gives inputs to the game, and includes a plurality of control switches. In response to the player's operation (e.g., pressing) of the control switches, the controller 19 outputs corresponding operation data to the video game device 15.

The TV monitor 11 displays image data outputted from the video game device 15.

A configuration of the video game device 15 will now be described. Referring to FIG. 2, the video game device 15 includes a CPU 21, a work memory 23, an external memory I/F 25 for exchanging data with the memory card 17, a controller I/F 27 for receiving operation data from the controller 19, a VRAM 29 being a memory dedicated for image processing, a GPU 31 for producing game images, and an optical disk drive 33 for reading data from the DVD-ROM 13.

At the start of the game, the optical disk drive 33 loads the DVD-ROM 13 mounted on the video game device 15. The game program read from the DVD-ROM 13 is stored in the work memory 23. The game program on the work memory 23 is executed by the CPU 21, thus starting the game process. After the start of the game, the player operates the controller 19, in response to which the controller 19 outputs the corresponding operation data to the video game device 15. The CPU 21 performs the game process based on the operation data. While the hardware configuration of the present exemplary illustrative embodiment includes a separate memory dedicated for image processing, the present invention is not limited to this, but may employ, for example, a unified memory architecture (UMA) in which a portion of the work memory 23 is used as a memory for image processing.

A memory map of the DVD-ROM 13 will now be described with reference to FIG. 3. The DVD-ROM 13 stores a racing game program 41 and racing game data 55 used by the racing game program 41.

The racing game program 41 at least includes a target place setting program 43, a driving performance value changing program 45, an automatic control program 47, a current place obtaining program 49, a target place changing program 51, a total score calculation program 53.

The racing game data 55 at least includes basic driving performance value data 57 and offset data 59.

The operation of the video game system of the present embodiment will now be described.

Figure 4:
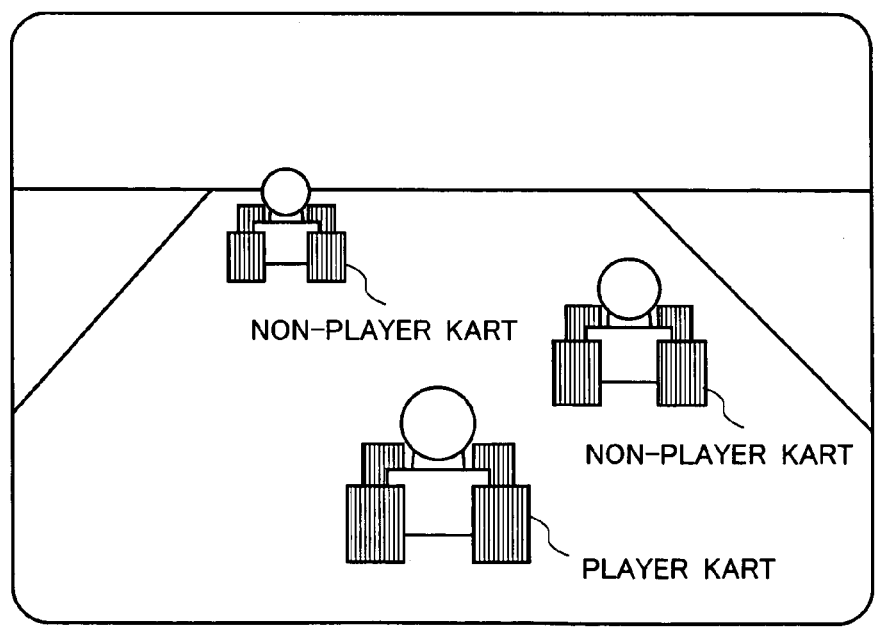
FIG. 4 shows an example of a game image.

FIG. 4 shows an example of a game image of the racing game played with the present video game system. This is a racing game in which a player kart controlled by a human player and a plurality of non-player karts automatically controlled based on a predetermined algorithm race together on a course in a virtual space. In this racing game, the karts race against one another in a series of five races for total scores, and each kart is awarded certain points after each race according to its results in that race. The kart with the highest end-of-series total score wins the game. While the present exemplary illustrative embodiment is directed to a kart racing game, the techniques disclosed herein may be applied to other racing games in which other types of moving objects, such as aircrafts or humans, race together.

Figure 5:
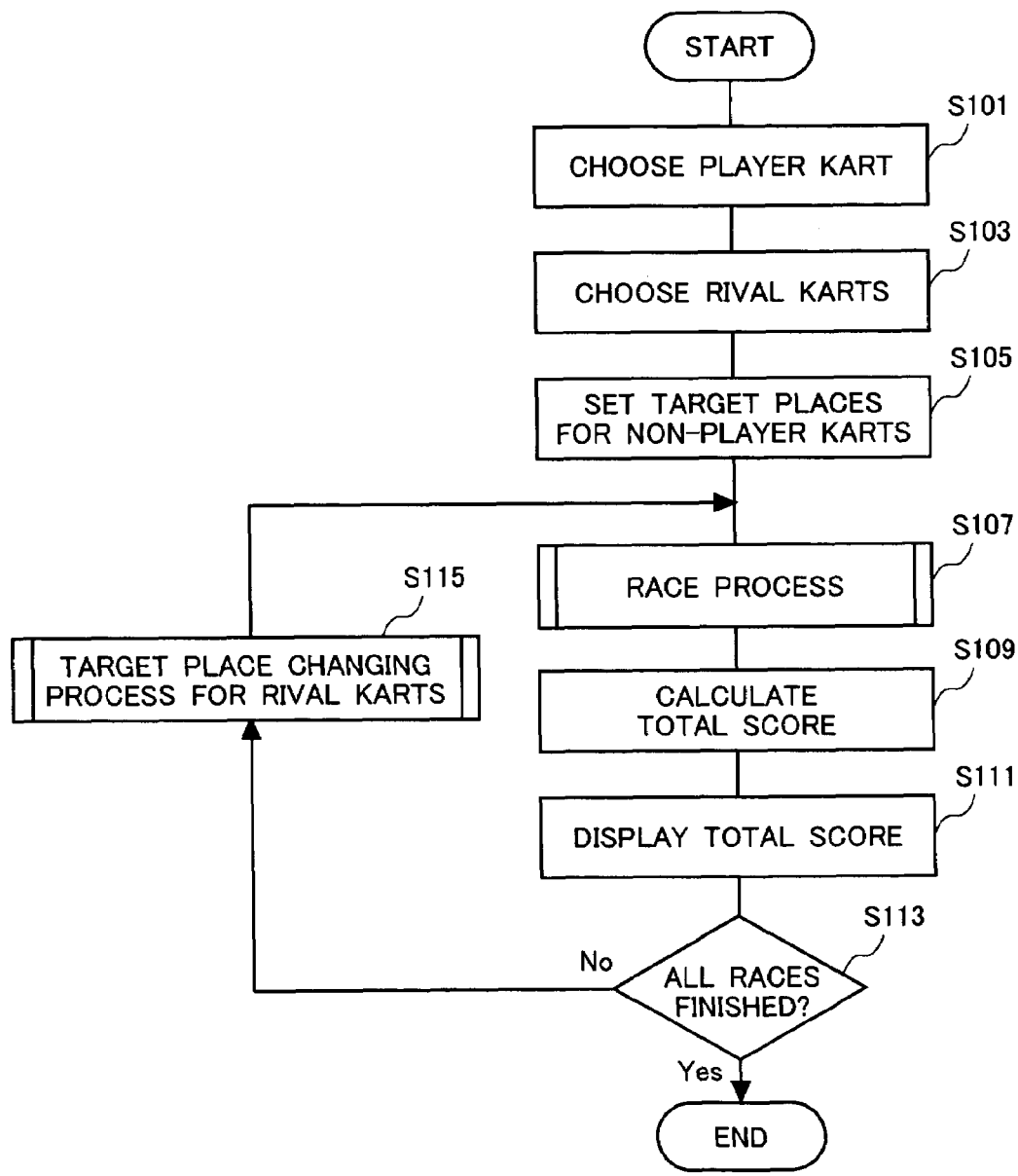
FIG. 5 is a flow chart illustrating the entire game process according to one exemplary illustrative embodiment.

Referring to the flow chart of FIG. 5, the flow of an exemplary illustrative game operation will now be described.

As the game process is started, the CPU 21 first prompts the player to choose one kart from among a plurality of karts (seven karts A to G in the illustrated example) (S101). Referring to FIG. 6, each kart is assigned basic driving performance values (the basic maximum speed and the basic acceleration), which are stored in the DVD-ROM 13 as the basic driving performance value data 57. While each kart has different basic driving performance values in the example shown in FIG. 6, these values are determined so that the total performance of one kart is unlikely to be significantly different from others. Alternatively, all the karts may be assigned substantially the same basic driving performance values. The kinds of the basic driving performance values are not limited to the maximum speed and the acceleration, but may also be other parameters related to the driving performance, such as the deceleration and the minimum speed.

Assume that the player chooses Kart B in step 101. Thus, the player controls Kart B as the player kart to race against the other, non-player karts (Karts A, C to G).

Then, the CPU 21 chooses two karts as rival karts from among those karts not chosen by the player in step 101 (Karts A, C to G in the illustrated example) (S103). A rival kart is a special kart among other non-player karts, and is a kart expected to win a higher total score than the other non-player karts (hereinafter referred to as the "normal karts"). Thus, each rival kart will be a strong rival for the player kart. The rival karts may be chosen randomly or by a predetermined rule. Where the rival karts are chosen randomly, different karts are likely to be chosen as the rival karts each time even if the player chooses to control the same kart over a number of games, whereby the player will not be playing against the same rival karts over and over.

Assume that Karts A and D are chosen as the rival karts in step 102.

Figure 3:
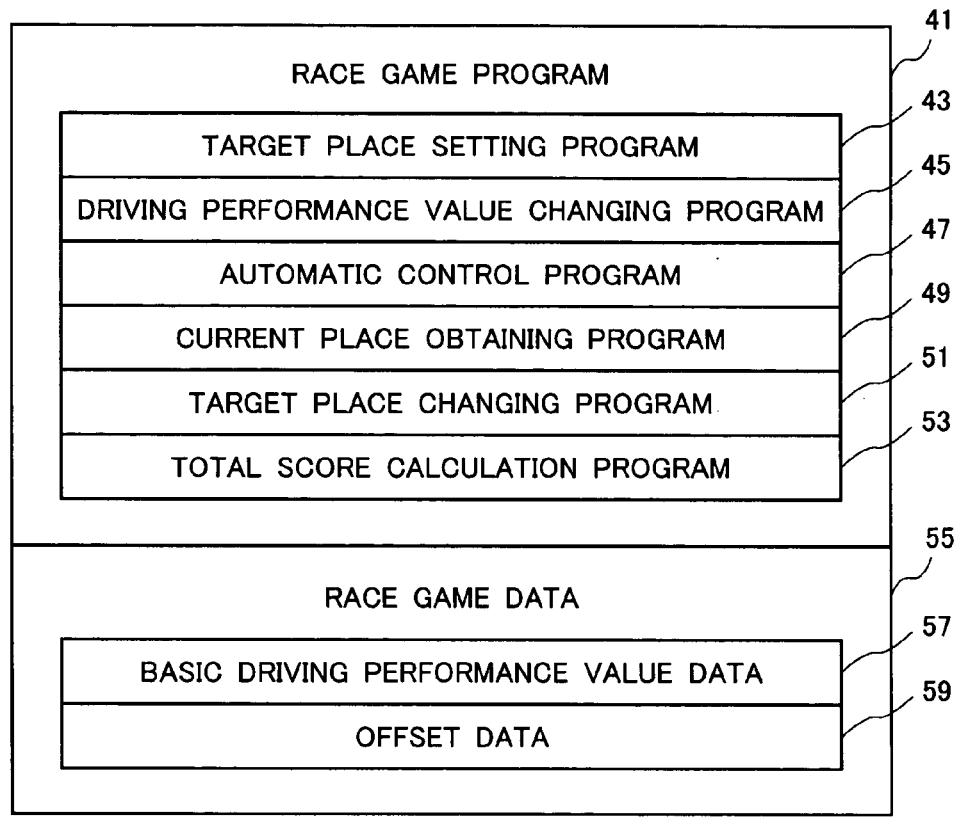
FIG. 3 is a memory map of a DVD-ROM 13.

Then, the CPU 21 determines the target place for each non-player kart based on the target place setting program 43 shown in FIG. 3 (S105). The target place of one rival kart is set to 1st, and that of the other rival kart to 2nd. The normal karts are assigned target places of 3rd or lower. The rival kart whose target place is set to 1st may be determined randomly or by a predetermined rule. Similarly, the target places of the normal karts may be determined randomly or by a predetermined rule.

Figures 8, 9:
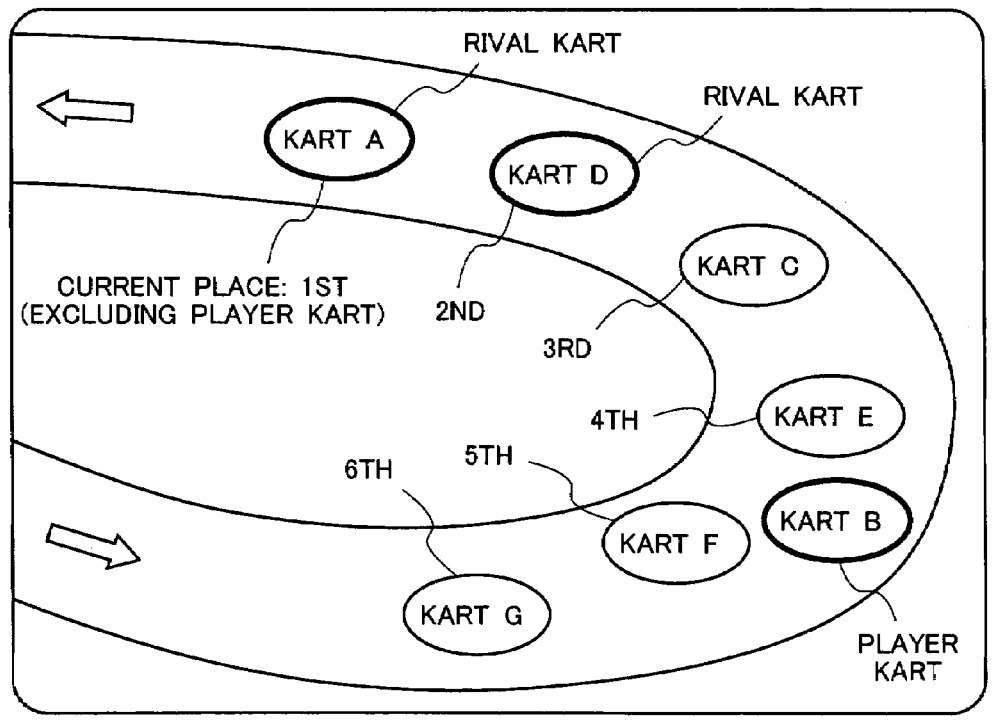
FIG. 8 shows an example of offset data 59.
FIG. 9 shows an example of the positional relationship between karts during a race.

The target places assigned to the non-player karts in step 105 are stored in the work memory 23 in the form of target place data as shown in FIG. 7. It is assumed herein that the non-player karts are assigned, in step 105, the target places as shown in FIG. 7. The target places determined in step 105 influence step 205 of FIG. 10 to be described later, in which the driving performance values of the non-player karts are determined. Specifically, offset values determined according to the target places as shown in FIG. 8 are added to the basic driving performance values shown in FIG. 6, thus determining the driving performance values of each non-player kart. For example, Kart A whose target place is 1st has a maximum speed of 130×1.3=169 and an acceleration of 2.5× 1.2=3.0. Data shown in FIG. 8 is stored in the DVD-ROM 13 as the offset data 59.

After the above-described operation, the CPU 21 starts the race process (S107). As described above, for each non-player kart, offset values determined according to the target places are added to the driving performance values in step 205 of FIG. 10 to be described later, whereby non-player karts with higher target places are likely to be in higher places during the race as illustrated in FIG. 9. Particularly, the two rival karts are quite likely to be in 1st and 2nd places among the non-player karts (i.e., excluding the player kart).

Referring to the flow chart of FIG. 10, the race process of step 107 will now be described in detail.

As the race process is started, the CPU 21 first reads operation data from the controller 19 (S201). Then, the CPU 21 calculates the speed of the player kart based on the operation data (S203).

Then, the CPU 21 determines the driving performance values of the non-player karts based on the driving performance value changing program 45 of FIG. 3 (S205). Specifically, offset values determined according to the target places are added to the basic driving performance values shown in FIG. 6 based on the offset data 59 shown in FIG. 8, thereby determining the driving performance values of the non-player karts.

Then, the CPU 21 detects the current place of each non-player kart based on the current place obtaining program 49 of FIG. 3 (S207). Note that the "current place" as used herein refers to the place among all the non-player karts (excluding the player kart). For example, the current place of Kart F in FIG. 9 is 5th.

Then, the CPU 21 calculates the speed of each non-player kart based on the automatic control program 47 of FIG. 3 (S209). The speed of each non-player kart is controlled so that the non-player kart will be in, or come closer to, a position according to its target place. Referring to the flow chart of FIG. 11, an example of such a control will now be described.

Figure 10:
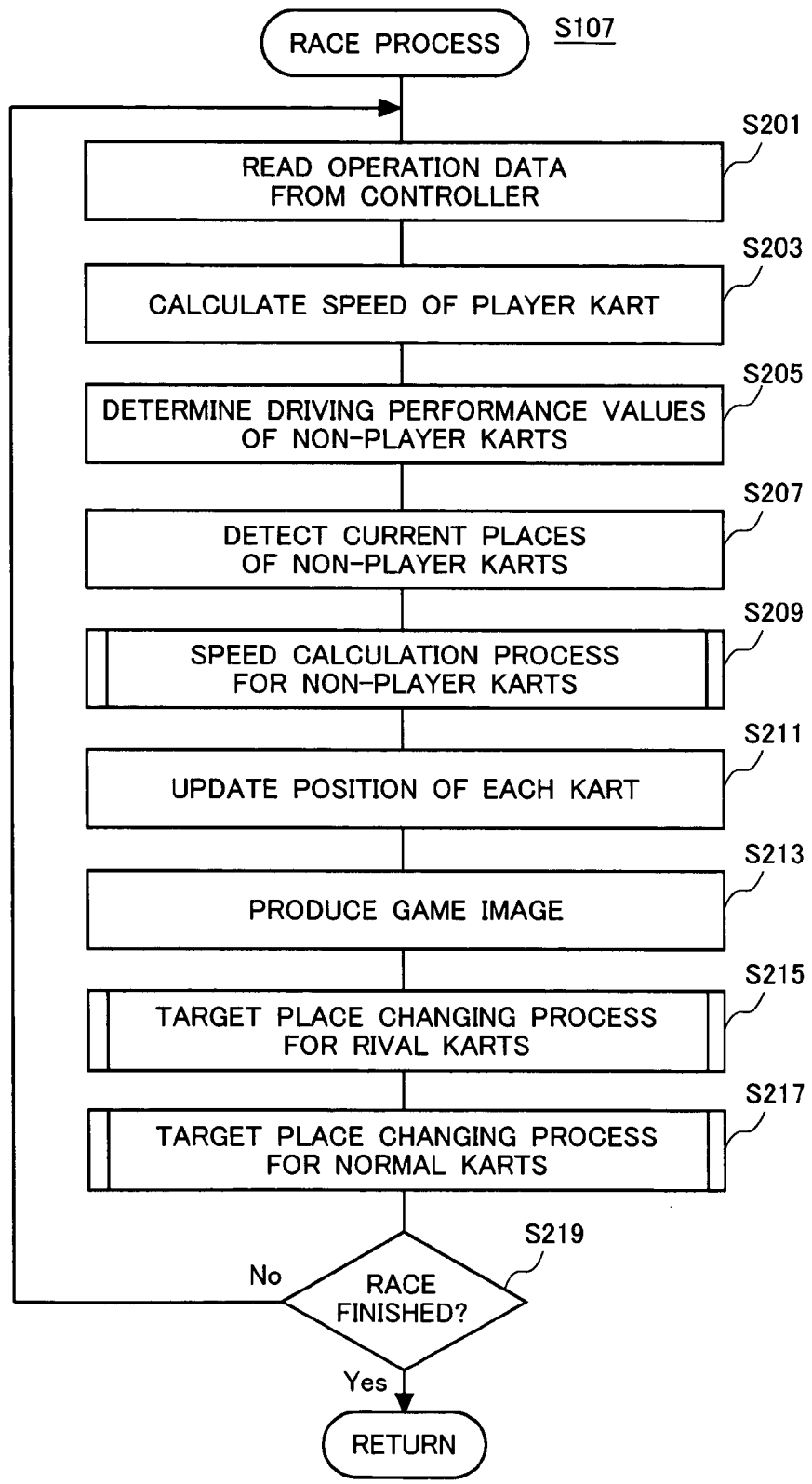
FIG. 10 is a flow chart illustrating an exemplary race process.
Figure 11:
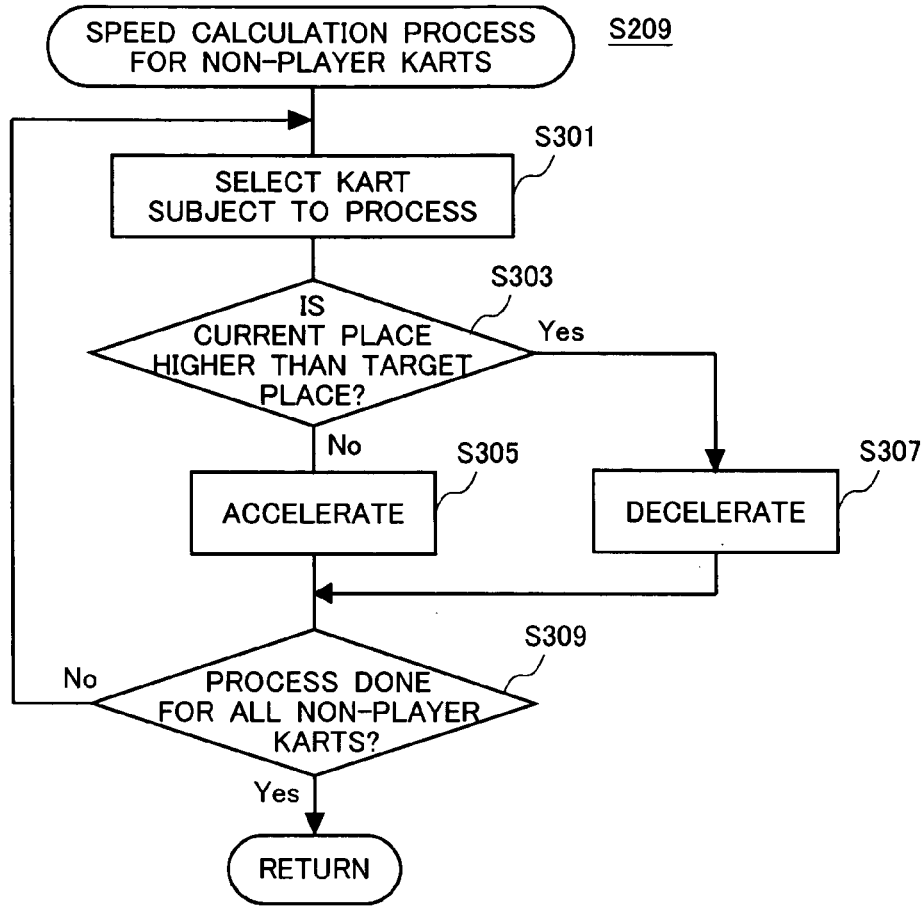
FIG. 11 is a flowchart illustrating a speed calculation process for non-player karts.
Figure 12:
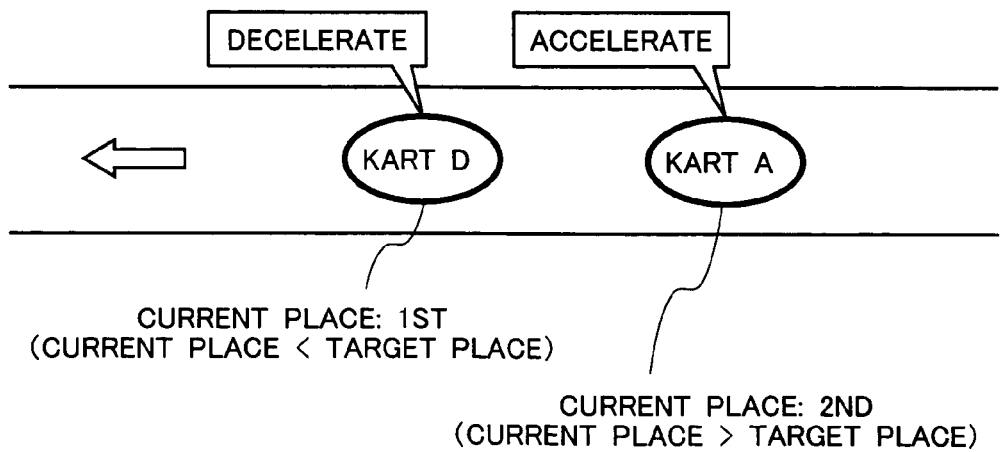
FIG. 12 shows a specific example of the speed calculation process for non-player karts.

Referring to FIG. 11, the CPU 21 first selects a non-player kart to be controlled (S301). Then, it is determined whether or not the current place (excluding the player kart) of the selected kart is higher than the target place (S303). If the current place is higher than the target place, the selected kart is decelerated (S307). If the current place is lower than or equal to the target place, the selected kart is accelerated (S305). For example, referring to FIG. 12, Kart D is decelerated because the current place (1st) of Kart D is higher than its target place (2nd), whereas Kart A is accelerated because the current place (2nd) of Kart A is lower than its target place (1st). In step 305, a kart is accelerated so that the speed after the acceleration will not exceed the maximum speed thereof determined in step 205 of FIG. 10. In step 307, a kart is decelerated so that the speed after the deceleration will not be under a predetermined lower speed limit. The lower speed limit is used for preventing the non-player kart from being so slow as to give the player an unnatural feel. Then, the CPU 21 determines whether or not the process has been done for all of the non-player karts (S309). If there is any non-player kart for which the process has not been done, the process returns to step 301.

Figure 13:
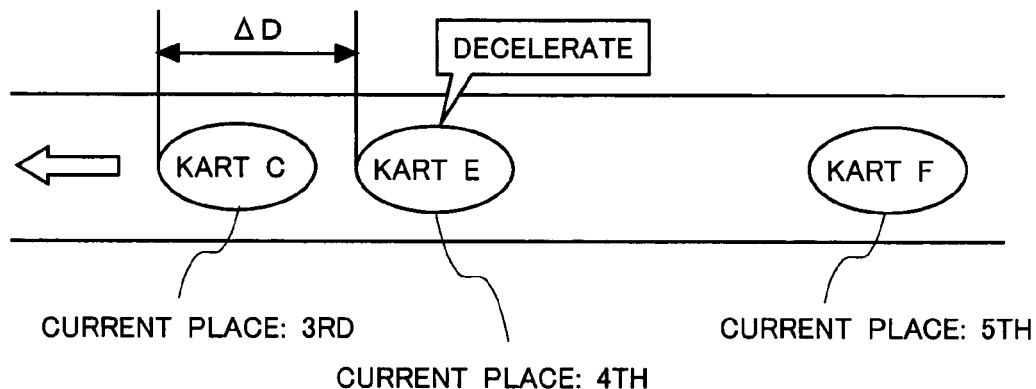
FIG. 13 shows a variation of the speed calculation process for non-player karts.

The specific process of step 209 is not limited to that shown in FIG. 11 as long as the speed of each non-player kart is controlled so that the non-player kart will be in, or come closer to, a position according to its target place. For example, referring to FIG. 13, the distance $\Delta D$ between the subject non-player kart and another non-player kart of a higher target place may be monitored, and the subject non-player kart may be accelerated or decelerated so that the distance $\Delta D$ is equal to, or come closer to, a predetermined value.

Since the speed of each non-player kart is controlled in step 209, the non-player kart will basically be in a position according to its target place as illustrated in FIG. 9. However, accidents, such as spinning, getting off the course, blocking and collision, may occur, whereby the non-player karts will not always be running in the expected order as shown in FIG. 9.

Referring back to FIG. 10, after step 209, the CPU 21 updates the positions of the karts (the player kart and the non-player karts) in a virtual space based on the results from step 203 and step 209 (S211). Then, the CPU 21 (or the GPU 31) produces a game image as shown in FIG. 4, and outputs a video signal for displaying the game image to the TV monitor 11 (S213).

Figure 14:
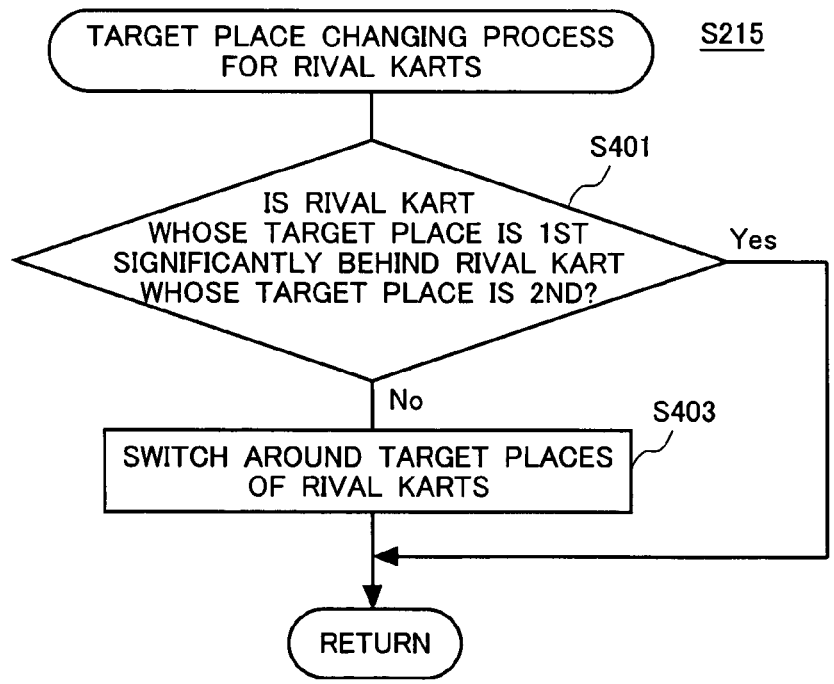
FIG. 14 is a flow chart illustrating a target place changing process (S213) for rival karts.
Figures 15, 16:
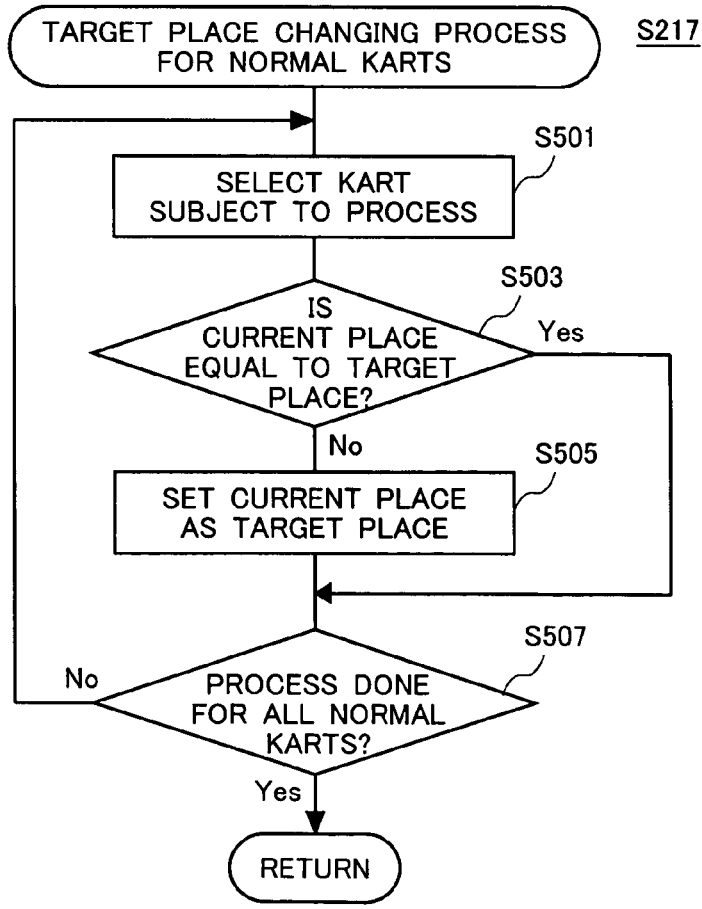
FIG. 15 shows another example of target place data stored in the work memory 23.
FIG. 16 is a flow chart illustrating a target place changing process for normal karts.

Then, the CPU 21 performs the target place changing process for the rival karts based on the target place changing program 51 of FIG. 3 (S215). FIG. 14 shows step 215 in detail. Referring to FIG. 14, the CPU 21 first determines whether or not the rival kart whose target place is 1st (Kart A in the illustrated example) is significantly behind the rival kart whose target place is 2nd (Kart B in the illustrated example) (S401). Whether the difference is significant may be determined based on whether or not the distance therebetween exceeds a predetermined value, whether or not the difference between the current places of the two rival karts exceeds a predetermined value, or whether or not the difference therebetween in the time they pass a checkpoint along the course exceeds a predetermined value. If it is determined that the rival kart whose target place is 1st is significantly behind the rival kart whose target place is 2nd, the target places of the two rival karts are switched around (S403). Specifically, the target place data of FIG. 7 stored in the work memory 23 is changed as shown in FIG. 15.

The advantage of the provision of step 215 will now be described.

Assume a case where step 215 is not provided. Then, assume that Kart A whose target place is 1st and which is running in the position as shown in FIG. 9 gets off the course and drops to last place. Thus, Kart D whose target place is 2nd is moved up to 1st place, and it will start decelerating, attempting to be in a place where it is supposed to be according to its target place. Since Kart D will keep decelerating until it is overtaken by Kart A, the player kart may be able to easily take over 1st place, thus making the game less thrilling.

In contrast, with the provision of step 215, the target places of Karts A and D are switched around when Kart A drops to last place, so that the new target place of Kart A is 2nd and that of Kart D is 1st. Therefore, Kart D will keep running in 1st place without decelerating, avoiding such a problem as described above. Thus, even if the rival kart whose target place is 1st falls significantly behind by an accident, the race will remain thrilling.

Referring to FIG. 10, after step 215, the CPU 21 performs the target place changing process for the normal karts based on the target place changing program 51 of FIG. 3 (S217). FIG. 16 shows step 217 in detail. Referring to FIG. 16, the CPU 21 first selects a normal kart to be subject to the process (S501). Then, it is determined whether or not the current place (excluding the player kart) of the selected kart is equal to its target place (S503). If the current place is different from the target place, the target place of the normal kart is changed to the value of the current place (S505). For example, in a case where Kart C whose target place is 3rd and which is running in the position as shown in FIG. 9 drops to last place, the target place data of FIG. 7 stored in the work memory 23 is changed as shown in FIG. 17. The purpose of this process is as follows. If Kart C falls significantly behind by an accident and the current place of Kart E is moved up from 4th to 3rd, and if the target place of Kart E remains to be 4th, Kart E will decelerate and fall excessively behind Kart D. Such a problem can be avoided by this process. Then, the CPU 21 determines whether or not the process has been done for all of the normal karts (S507). If there is any normal kart for which the process has not been done, the process returns to step 501.

Referring to FIG. 10, after step 217, the CPU 21 determines whether or not the race has finished (S219). If the race has not finished, the process returns to step 201. Otherwise, the race process is terminated.

Referring back to FIG. 5, when the race process is terminated, the CPU 21 awards each kart certain points according to the results of the race in step 107 and calculates the current total score for each kart based on the total score calculation program 53 shown in FIG. 3. Then, the CPU 21 produces a game image for displaying the calculation results (S111). The game image produced in step 111 is displayed on the TV monitor 11 as shown in FIG. 18. Referring to FIG. 18, the TV monitor 11 displays the total score of each kart after the third race. As can be seen from FIG. 18, a non-player kart of a higher target place basically has a higher total score.

Then, the CPU 21 determines whether or not all of the races (the first to fifth races in the illustrated example) have been completed (S113). If so, the game process is terminated. Otherwise, the process proceeds to step 115.

Figure 19:
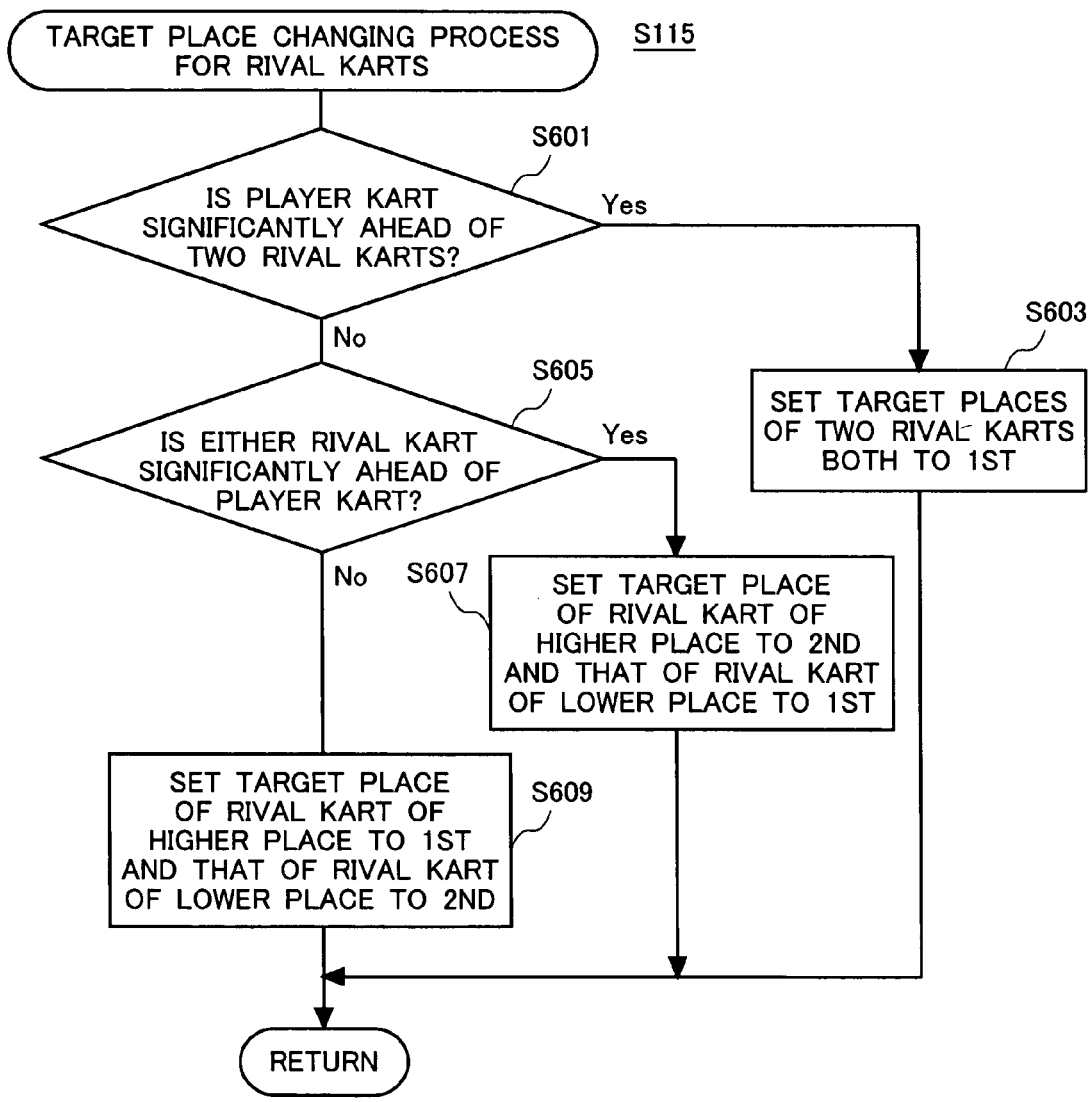
FIG. 19 is a flow chart illustrating a target place changing process for rival karts (S115)

In step 115, the CPU 21 performs the target place changing process for the rival karts based on the target place changing program 51 of FIG. 3. FIG. 19 shows step 115 in detail.

Referring to FIG. 19, the CPU 21 first determines whether or not the player kart is significantly ahead of the two rival karts (S601). Specifically, whether the difference is significant may be determined based on whether or not the difference between the total score of the player kart and those of the rival karts exceeds a predetermined value. If it is determined that the player kart is significantly ahead of the two rival karts, the target places of the two rival karts are both set to 1st (S603). For example, in the example shown in FIG. 20, since the player kart (Kart B) is significantly ahead of the two rival karts (Karts A, D), the target place data of FIG. 7 stored in the work memory 23 is changed as shown in FIG. 21. As a result, in the next race, the two rival karts will be racing both aiming to win 1st place, whereby it will be more difficult for the player kart to win 1st place, thus making the race even more thrilling.

If "No" is returned in step 601 of FIG. 19, the CPU 21 determines whether or not either rival kart is significantly ahead of the player kart (S605). Whether the difference is significant may be determined, for example, based on whether or not the difference between the total score of the player kart and that of either rival kart exceeds a predetermined value, or whether or not the difference between the overall standing of the player kart and that of either rival kart exceeds a predetermined value. If it is determined that either rival kart is significantly ahead of the player kart, the target place of the rival kart with the higher total score is set to 2nd and that of the other rival kart to 1st (S607). For example, in the example of FIG. 22, since the rival kart (Kart A) is significantly ahead of the player kart (Kart B), the target place data of FIG. 7 stored in the work memory 23 is changed as shown in FIG. 23. As a result, Kart A is less likely to win 1st place in the next race. Thus, it is possible to avoid a situation where the total score of Kart A is so much higher than that of the player kart as to make the player less motivated.

Thus, according to an exemplary illustrative embodiment, it is likely that the total scores of the rival karts stay close to that of the player kart, whereby the player will be kept thrilled.

As described above, in an exemplary illustrative embodiment, if a rival kart whose target place is 1st (Kart X) falls significantly behind the other rival kart whose target place is 2nd (Kart Y) by an accident, the target place of Kart X is changed to 2nd. The target place is changed only if the difference between the two rival kart is significant for the following reason. If the target place of Kart X is more easily changed to 2nd, Kart X is less likely to win 1st place in that race, and the total score of Kart X will likely be lowered, thus decreasing the difficulty of the game. Moreover, in an exemplary illustrative embodiment, if Kart X falls significantly behind Kart Y, the target place of Kart X is lowered only to 2nd, instead of lowering it down to the value of the current place as with the normal karts, for the following reason. If the target place of a rival kart is set excessively low, the total score of the rival kart will be excessively low, whereby the rival kart can no longer be a strong rival for the player kart.

While the racing game program 41 is loaded from the DVD-ROM 13 to the video game device 15 in an exemplary illustrative embodiment, the present invention is not limited to this. Alternatively, the racing game program 41 may be pre-stored in any recording medium in the video game device 15, or the racing game program 41 may be loaded to the video game device 15 through a communications medium such as a wired or wireless communications line or a communications cable.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer-readable recording medium, storing a racing game program for playing a racing game in which a player moving object controlled by a human player and a plurality of non-player moving objects automatically controlled based on a predetermined algorithm race together on a course in a virtual space, wherein the racing game program instructs a computer to function as:
   a target rank setter for setting different target ranks for at least two of the plurality of non-player moving objects, the target ranks being set irrespective of a current rank associated with any of the non-player moving objects in the race;
   a driving performance value changer for changing a driving performance value preset for each of the non-player moving objects according to the target rank thereof set by the target rank setter; and
   an automatic controller for automatically controlling each of the non-player moving objects according to the driving performance value thereof which has been changed by the driving performance value changer.

2. The computer-readable recording medium according to claim 1, wherein the driving performance value includes at least one of a maximum speed performance value and an acceleration performance value.

3. The computer-readable recording medium according to claim 1, wherein:
   the racing game program instructs the computer to function further as a current rank obtainer for obtaining a current rank of each non-player moving object running on the course among the plurality of non-player moving objects; and
   the automatic controller controls a speed of each non-player moving object so that the current rank thereof comes closer to the target rank thereof.

4. The computer-readable recording medium according to claim 1, wherein the racing game program instructs the computer to function further as a target rank changer for changing the target ranks set by the target rank setter.

5. The computer-readable recording medium according to claim 4, wherein the target rank changer changes the target ranks of the non-player moving objects while the non-player moving objects are running on the course.

6. The computer-readable recording medium according to claim 5, wherein:
   the plurality of non-player moving objects include two rival moving objects and at least one normal moving object;
   the target rank setter sets the target rank of a first one of the two rival moving objects to 1st while setting the target rank of a second one of the two rival moving objects to 2nd; and
   if the first rival moving object whose target rank is 1st falls significantly behind the second rival moving object whose target rank is 2nd, the target rank changer switches the target ranks of the first and second rival moving objects.

7. The computer-readable recording medium according to claim 4, wherein:
   the racing game is such that a plurality of moving objects, including the player moving object and the non-player moving objects, compete against one another for total scores determined based on results of a series of races;
   the racing game program instructs the computer to function further as a total score calculator for calculating a total score of each moving object after each race; and
   the target rank changer changes the target ranks based on the calculation by the total score calculator after a race is finished and before a next race begins.

8. The computer-readable recording medium according to claim 7, wherein:
   the plurality of non-player moving objects include two rival moving objects and at least one normal moving object;
   the target rank setter sets the target rank of a first one of the two rival moving objects to 1st while setting the target rank of a second one of the two rival moving objects to 2nd; and
   after a race, if the total score of either one of the two rival moving objects or an overall standing thereof determined based on the total score is significantly higher than that of the player moving object, the target rank changer changes the target ranks of the two rival moving objects so that the target rank of the rival moving object with a higher total score is 2nd while that of the rival moving object with a lower total score is 1st.

9. The computer-readable recording medium according to claim 7, wherein:
   the plurality of non-player moving objects include two rival moving objects and at least one normal moving object;
   the target rank setter sets the target rank of one of the two rival moving objects to 1st while setting the target rank of the other rival moving object to 2nd; and
   after a race, if the total scores of the two rival moving objects are both significantly lower than that of the player moving object, the target rank changer changes the target ranks of the two rival moving objects so that the target ranks of the first and second rival moving objects are both 1st.

10. The computer-readable recording medium according to claim 1, wherein the target rank setter initially sets the different target ranks for said at least two of the plurality of non-player moving objects before a race process between the player moving object and the non-player moving objects provided by execution of the racing game program by the computer begins.

11. A video game device, comprising the computer-readable recording medium according to claim 1, and a computer for executing the racing game program stored in the computer-readable recording medium.

12. A method of executing a racing game in which a player moving object is controlled by a human player and a plurality of non-player moving objects are automatically controlled based on a predetermined algorithm race together on a course in a virtual space, the method comprising:

setting different target ranks for at least two of the plurality of non-player moving objects, the target ranks being set irrespective of a current rank associated with any of the non-player moving objects in the race;

changing a driving performance value preset for each of the non-player moving objects according to the target rank thereof; and automatically controlling each of the non-player moving objects according to the driving performance value thereof which has been changed.

13. The method of claim 12, wherein the driving performance value includes at least one of a maximum speed performance value and an acceleration performance value.

14. The method of claim 12, further comprising:

obtaining a current rank of each non-player moving object running on the course among the plurality of non-player moving objects; and automatically controlling a speed of each non-player moving object so that the current rank thereof comes closer to the target rank thereof.

15. The method of claim 12, further comprising changing the target ranks set by the target rank setting step.

16. The method of claim 15, wherein the target rank changing step changes the target ranks of the non-player moving objects while the non-player moving objects are running on the course.

17. The method of claim 16, wherein:

the plurality of non-player moving objects include two rival moving objects and at least one normal moving object;

the target rank setting step sets the target rank of a first one of the two rival moving objects to 1st while setting the target rank of a second one of the two rival moving objects to 2nd; and if the first rival moving object whose target rank is 1st falls significantly behind the second rival moving object whose target rank is 2nd, the target rank changer switches the target ranks of the first and second rival moving objects.

18. The method of claim 15, further comprising calculating a total score of each moving object after each race;

wherein the racing game is such that a plurality of moving objects, including the player moving object and the non-player moving objects, compete against one another for total scores determined based on results of a series of races, and wherein the target rank changing step changes the target ranks based on the calculation by the total score calculator after a race is finished and before a next race begins.

19. The method of claim 18, wherein:

the plurality of non-player moving objects include two rival moving objects and at least one normal moving object;

the target rank setting step sets the target rank of a first one of the two rival moving objects to 1st while setting the target rank of a second one of the two rival moving objects to 2nd; and after a race, if the total score of either one of the two rival moving objects or an overall standing thereof determined based on the total score is significantly higher than that of the player moving object, the target rank changing step changes the target ranks of the two rival moving objects so that the target rank of the rival moving object with a higher total score is 2nd while that of the rival moving object with a lower total score is 1st.

20. The method of claim 18, wherein:

the plurality of non-player moving objects include two rival moving objects and at least one normal moving object;

the target rank setting step sets the target rank of one of the two rival moving objects to 1st while setting the target rank of the other rival moving object to 2nd; and after a race, if the total scores of the two rival moving objects are both significantly lower than that of the player moving object, the target rank changing step changes the target ranks of the two rival moving objects so that the target ranks of the first and second rival moving objects are both 1st.

21. The method of claim 12, wherein the setting different target ranks step is executed before a race process between the player moving object and the non-player moving objects provided by execution of the racing game begins.

* * * * *